(12) United States Patent
Park et al.

(10) Patent No.: US 9,587,541 B2
(45) Date of Patent: Mar. 7, 2017

(54) MULTIFUNCTIONAL EXHAUST GAS PURIFYING FILTER, AND EXHAUST GAS PURIFYING APPARATUS USING THE SAME

(75) Inventors: Jong-Soo Park, Daejeon (KR);
Young-Jae Lee, Daejeon (KR);
Kyung-Ran Hwang, Daejeon (KR);
Shin-Kun Ryi, Daejeon (KR);
Dong-Kook Kim, Daejeon (KR);
Tae-Hwan Kim, Daejeon (KR);
Chun-Boo Lee, Daejeon (KR);
Kyung-Sun Yoo, Seoul (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 340 days.

(21) Appl. No.: 14/000,809

(22) PCT Filed: Dec. 6, 2011

(86) PCT No.: PCT/KR2011/009393
§ 371 (c)(1),
(2), (4) Date: Aug. 21, 2013

(87) PCT Pub. No.: WO2012/115336
PCT Pub. Date: Aug. 30, 2012

(65) Prior Publication Data
US 2014/0004013 A1    Jan. 2, 2014

(30) Foreign Application Priority Data
Feb. 21, 2011    (KR) .................. 10-2011-0015254

(51) Int. Cl.
*F01N 3/20*    (2006.01)
*F01N 3/28*    (2006.01)
(Continued)

(52) U.S. Cl.
CPC ......... *F01N 3/2066* (2013.01); *B01D 53/944* (2013.01); *B01D 53/9477* (2013.01);
(Continued)

(58) Field of Classification Search
None
See application file for complete search history.

(56) References Cited

U.S. PATENT DOCUMENTS 5,519,993 A    5/1996  Rao et al.
6,696,031 B1 *  2/2004  Twigg et al. ............. 423/212
(Continued)

FOREIGN PATENT DOCUMENTS

JP    59-58117    4/1984
KR    10-2009-0104441    10/2009
(Continued)

OTHER PUBLICATIONS

International Search Report for International Application No. PCT/KR2011/009393, European Patent Office, Netherlands, mailed Jul. 7, 2012.
(Continued)

*Primary Examiner* — Walter D Griffin
*Assistant Examiner* — Jelitza Perez
(74) *Attorney, Agent, or Firm* — Sterne, Kessler, Goldstein & Fox PLLC (57) ABSTRACT

The present invention relates to a configuration method of a multifunctional particulate filter (MFPF), capable of reducing the content of particulate material (PM), carbon monoxide (CO) and hydrocarbons (HC), and increasing the content of nitrogen dioxide ($NO_2$). The MFPF may coat zeolite and an oxidation catalyst on both exhaust gas intake/discharge sides simultaneously, so as to minimize the slippage of HC and generate high-concentration $NO_2$.

7 Claims, 4 Drawing Sheets

(51) Int. Cl.
*F01N 3/08* (2006.01)
*F01N 3/022* (2006.01)
*B01D 53/94* (2006.01)

(52) U.S. Cl.
CPC .......... *F01N 3/022* (2013.01); *F01N 3/0835* (2013.01); *F01N 3/208* (2013.01); *F01N 3/2803* (2013.01); *B01D 53/9418* (2013.01); *B01D 2255/1021* (2013.01); *B01D 2255/1023* (2013.01); *B01D 2255/50* (2013.01); *B01D 2255/912* (2013.01); *B01D 2255/9155* (2013.01); *B01D 2257/502* (2013.01); *B01D 2257/702* (2013.01); *B01D 2258/012* (2013.01); *F01N 2610/02* (2013.01); *Y02T 10/24* (2013.01)

(56) References Cited

U.S. PATENT DOCUMENTS

| | | | |
|---|---|---|---|
| 7,799,298 | B2 | 9/2010 | Pfeifer et al. |
| 2003/0115859 | A1* | 6/2003 | Deeba .............................. 60/297 |
| 2004/0052699 | A1* | 3/2004 | Molinier et al. .............. 422/180 |
| 2007/0104623 | A1* | 5/2007 | Dettling et al. ............... 422/177 |
| 2010/0126150 | A1* | 5/2010 | Choi ............................... 60/297 |
| 2011/0123421 | A1* | 5/2011 | Grubert ............... B01D 53/944 423/212 |

FOREIGN PATENT DOCUMENTS

| | | |
|---|---|---|
| KR | 10-2010-0119378 | 11/2010 |
| KR | 10-2012-0011526 | 2/2012 |

OTHER PUBLICATIONS

English language Abstract of Japanese Patent Publication No. 59-58117, European Patent Office, espacenet database—Worldwide (1984).
English language Abstract of Korean Patent Publication No. 10-2009-0104441 A, European Patent Office, World Intellectual Property Organization database—Worldwide (2006).
English language Abstract of Korean Patent Publication No. 10-2010-011938 (2010).
English language Abstract of Korean Patent Publication No. 10-2012-0011526 (2012).
"Catalyst-Based Diesel Particulate Filters and NOx Adsorbers: A Summary of the Technologies and the Effects of Fuel Sulfer," Manufacturers of Emission Controls Association, pp. 1-28, Washington D.C., United States (2000).
Joshi, A., et al., "Development of an Actively Regenerating DPF System for Retrofit Applications," reprinted from Commercial Vehicle Emissions (SP-2052), SAE International (2006).
Issa, M., et al., "Oxidation of Carbon by $CeO_2$: Effect of the Contact Between Carbon and Catalyst Particles," *Fuel 87*:740-750, Elsevier Ltd., England (2007).

* cited by examiner

MULTIFUNCTIONAL EXHAUST GAS PURIFYING FILTER, AND EXHAUST GAS PURIFYING APPARATUS USING THE SAME

TECHNICAL FIELD

The present invention relates to an exhaust gas purifying apparatus for an automobile, and more specifically to a low-price filter configuration method capable of greatly reducing particulate material (PM), carbon monoxide (CO), and hydrocarbon (HC) contained in exhaust gas and generating high-concentration nitrogen dioxide.

BACKGROUND ART

A diesel vehicle is recognized as a short-term solution of the $CO_2$ problem due to its high power and high energy efficiency. However, large quantities of pollutants such as PM, CO, HC and NOx are contained in diesel engine exhaust gas, so they cause environmental pollution problems. Therefore, reducing apparatus of such pollutants is indispensable for completion of a clean diesel.

CO, HC and PM can be removed by installing cDPF at a rate of 90% or more. However, as for reduction of NOx, it is still under study.

NOx can be decomposed through the following reaction mechanism on a catalyst under existence of a reducing agent.

(1)

(2)

(3)

Figure 1:
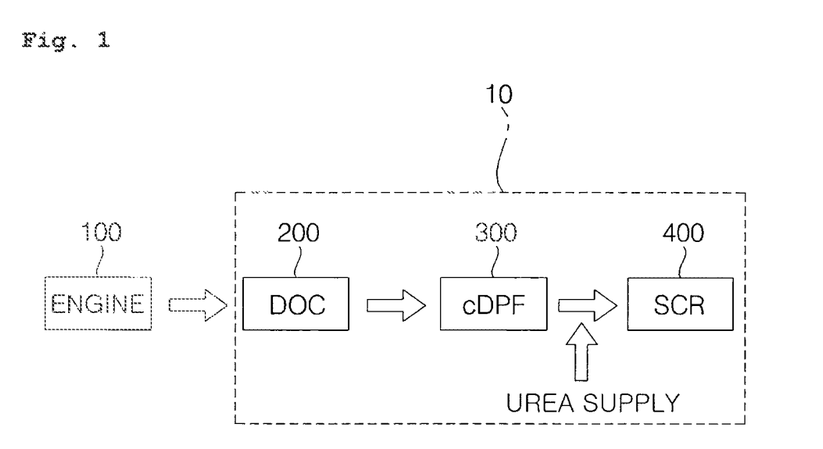
FIG. 1 is a block diagram showing an example of an exhaust gas purifying apparatus according to the related art.

For reduction of nitrogen oxides, an exhaust gas purifying apparatus 10 is disclosed in the related art as illustrated in FIG. 1. The exhaust gas purifying apparatus includes a diesel oxidation catalyst (DOC) 200, a catalyzed diesel particulate filter (cDPF) 300 and a selective catalytic reduction (SCR) catalyst 400 installed sequentially at the rear end of an engine 100. Nitrogen oxides, CO, HC, and PM can be reduced by the exhaust gas purifying apparatus of such configuration.

According to the results of recent research, it is reported that it is possible to obtain a fast SCR of more than ten times when a reaction progresses on the path of reaction formula (2), as compared with reaction formula (1), in terms of kinetics of reaction (Manfred Koebel et al, Selective catalytic reduction of NO and $NO_2$ at a low temperature, Catalysis Today, 73, 239-247(2002)). However, because the concentration of $NO_2$ contained in exhaust gas of a car is less than 30% of the whole NOx, the level of contribution of self fast SCR progress is low.

That is, for SCR to progress through the path of reaction formula (2), a proper action is required so that the $NO_2$ content in NOx can satisfy 50%. However, it is difficult to satisfy the $NO_2/NOx$ ratio in the gas supplied to the SCR catalytic layer by the configuration of FIG. 1, although $NO_2$ is formed by the following reaction formula (4) under DOC. Therefore, it is necessary to improve the removal efficiency of nitrogen oxides.

(4)

The cause of the problem with such a $NO_2/NOx$ ratio is because $NO_2$ formed through the path of reaction formula (4) in DOC goes on with PM collected in cDPF and reaction according to reaction formula (5).

That is, such reaction is desirable in terms of PM removal, but is not desirable in terms of nitrogen oxide reduction since it makes reverse action in achieving the fast SCR. It is because PM acts as a reducing agent of $NO_2$ so that the ratio of $NO_2/NOx$ in exhaust gas introduced into the SCR is decreased depending on the PM collection quantity in the cDPF.

(5)

Figure 2:
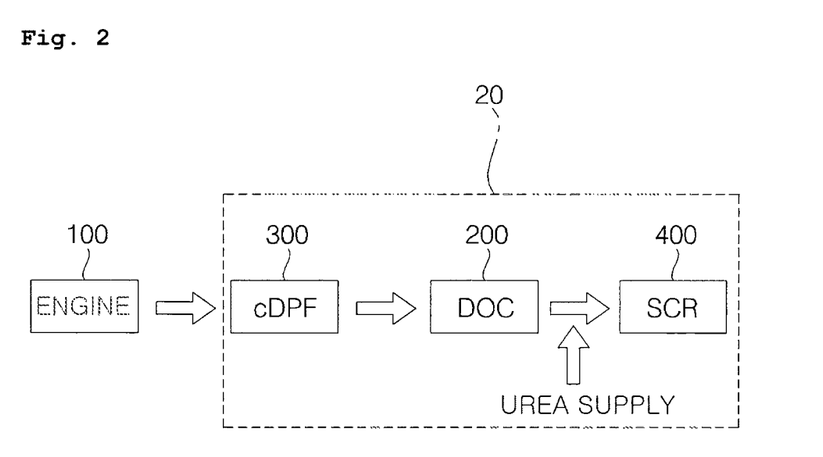
FIG. 2 is a block diagram showing another example of the exhaust gas purifying apparatus according to the related art.

For the purpose of improving the above-described problem, an exhaust gas purifying apparatus 20 is disclosed in the related art as illustrated in FIG. 2. The exhaust gas purifying apparatus uses a system of such configuration that can obtain a high $NO_2$ concentration by arranging a DOC 200 downstream of a cDPF 300 and upstream of a SCR 400.

The above-described purifying apparatuses have no spatial clearance because they are installed on the lower body of a vehicle. In particular, because a change in a temperature of the exhaust gas is higher depending on the moving speed of vehicle, a maintenance fraction (time average) at 200° C. or more, which is the SCR action range, is no more than 50% based on small cars driving in downtown area.

That is, it is necessary to provide a post-treatment apparatus having such a configuration that, while a vehicle stops, exhaust gas at a temperature of more or less than 100° C. is supplied to cool a SCR catalytic layer, and when the vehicle departs and starts driving, a high-temperature exhaust gas is supplied thereto and used as a heat source to quickly raise the temperature of the SCR catalytic layer.

In addition, a SCR using an aqueous solution of urea as a reducing agent has its function decreased when hydrocarbon (HC) is contained in the exhaust gas. Therefore, it is essential that HC is removed from inflow gas. In particular, in case of stopping the vehicle, when a low-temperature exhaust gas contains hydrocarbon, that is, HC and the temperature of an oxidation catalyst in the purifying apparatus is low, oxidation reaction of HC is impossible, therefore, the exhaust gas containing HC not removed is supplied to the SCR catalytic layer. Therefore, it is not avoidable that HC is adsorbed in zeolite as a SCR catalyst. The SCR function cannot be exerted 100% until most of the exhaust gas is discharged by heating to and above a given temperature at which HC is released. Because of that, an apparatus with such a configuration that can suppress the supply of SCR in a low-temperature zone, is necessary.

Especially, a recent sharp rise in prices of precious metals acts as a limiting factor on use of precious metals over the whole industry. Therefore, in the field of automobile exhaust gas post-treatment which consumes large quantities of precious metals, it is absolutely necessary to minimize the consumption of precious metals along with functional performance satisfaction.

DISCLOSURE

Technical Problem

Therefore, a general object of the present invention is to provide a multifunctional exhaust gas purifying filter (hereinafter briefly referred to as a "MFPF") in order to solve the problems as described above.

A first object of the present invention is to provide a filter for post-treatment of exhaust gas that can minimize a time for reaching a SCR operational temperature as well as raising an $NO_2/NOx$ ratio.

A second object of the present invention is to provide a filter for post-treatment of exhaust gas that suppresses flowing of HC, which reduces function of urea SCR to half, into a SCR catalytic layer.

A third object of the present invention is to provide a filter for post-treatment of exhaust gas that minimizes consumption of precious metals required for reduction of contaminants.

A fourth object of the present invention is provide an exhaust gas treatment apparatus using the filter for post-treatment of exhaust gas.

Technical Solution

First, in order to improve the efficiency of SCR, it is preferable that the ratio of $NO_2/NO$ becomes 1, as shown in reaction formula (2). That is, a multifunctional exhaust gas purifying filter, which removes DOC acting as a heat reservoir upstream of SCR and has a function to increase the $NO_2/NOx$ ratio in the gas supplied to the SCR catalytic layer is provided.

Figure 3:
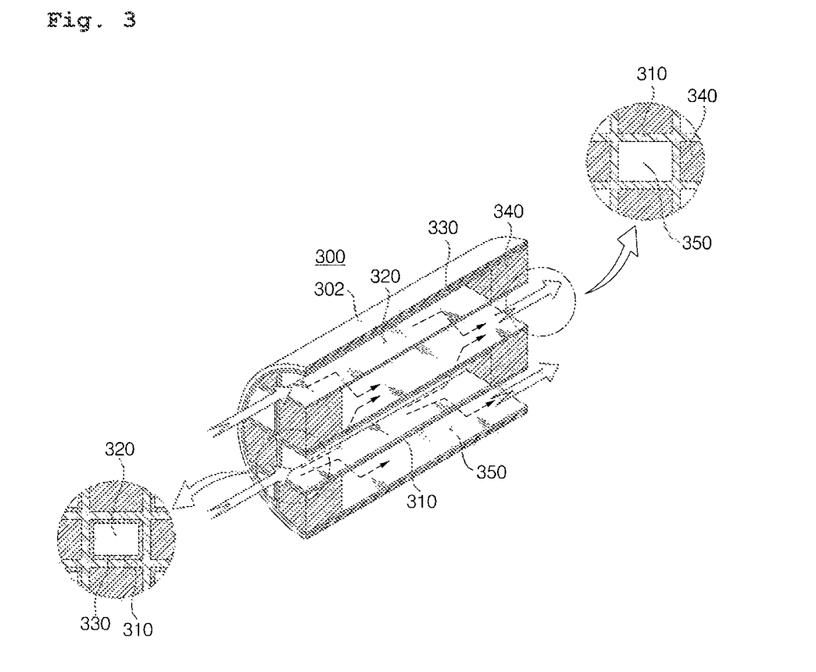
FIG. 3 is a schematic view showing the configuration of an exhaust gas purifying filter (cDPF) according to the related art.

As illustrated in FIG. 3, in an exhaust gas purifying filter (cDPF) 300 according to the related art, an oxidation catalyst is coated on a gas inlet path where exhaust gas is introduced, in order to burn hydrocarbon contained in the exhaust gas simultaneously with PM oxidation. To describe more in detail, the exhaust gas purifying filter 300 includes a housing 302 and a plurality of channels extending in a longitudinal direction in the housing and having cross-sections of grid shape formed by air-penetrable walls 310. In addition, a gas inlet passage 320 and a gas outlet passage 350 are defined in each channel by plugs 340 installed in the upstream end portion or the downstream end portion of the gas flow direction.

Each gas inlet passage 320 and each gas outlet passage 350 are disposed alternately each other. The circumference of one gas inlet passage 320 is surrounded by the gas outlet passage 350, while the circumference of one gas outlet passage 350 is surrounded by the gas inlet passage 320. Eventually, the exhaust gas flowing into the gas inlet passage 320 passes through the gas penetrable wall 310 to move to the gas outlet passage 350.

The gas penetrable wall 310 is made of ceramic-like materials, for example, cordierite, α-alumina, silicon carbide, silicon nitride, zirconia, mullite, spodumene, alumina-silica-magnesia, or zirconium silicate, or fire-resistant porous metals. Further, the gas penetrable wall 310 may be made of ceramic fiber complex materials. The material of a wall flow monolith according to another embodiment may be at least one of aluminum titanate, cordierite, silicon carbide, metal oxide and ceramic.

In addition, in order to burn hydrocarbon contained in the exhaust gas simultaneously with PM oxidation, the oxidation catalyst 330 is coated on the inner wall of the gas inlet passage 320. As the oxidation catalyst 330, an oxidation catalyst with strong PM, HC, and CO oxidation reaction, for example, a mixture of platinum and palladium or single component catalyst may be used. When mixing the same, a content ratio of palladium to platinum preferably ranges from 10:1 to 1:10.

The exhaust gas is purified as it passes through an opening of the gas penetrable wall 310 and is discharged through the gas outlet passage 350. In this case, in order to solve the problem of low generation efficiency of $NO_2$, an oxidation catalytic layer (DOC) is provided downstream of the cDPF, as illustrated in FIG. 2. Because of that, a technical con-figuration of increasing $NO_2$ content by oxidation of nitrous oxide (NO) is inevitably resulted.

Figure 4:
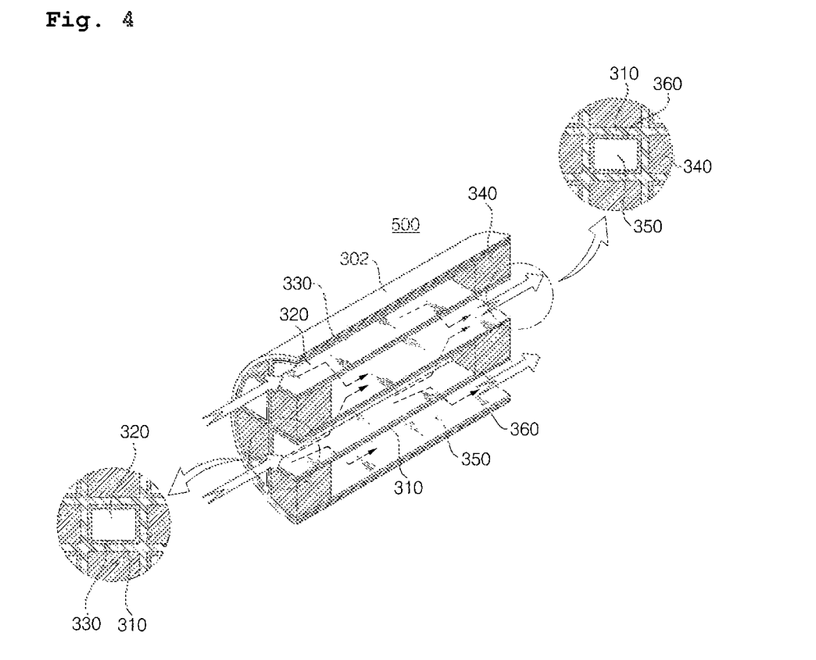
FIG. 4 is a schematic view showing the configuration of a multifunctional exhaust gas purifying filter (MFPF) according to a first embodiment of the present invention.

In order to achieve the first object of the present invention, the oxidation catalyst is coated on the surface of a discharge hole where purified exhaust gas is discharged, as illustrated in FIG. 4. Therefore, NO contained in the gas without particulate that was removed while passing through fine pores of the filter wall is oxidized, so that the $NO_2$ content is increased. Accordingly, it is possible to completely exclude a change in the $NO_2/NO$ ratio depending on the collection quantity of particulate in the filter. That is, the MFPF may be composed by integrating a cDPF and a DOC into the same honeycomb structure. Accordingly, excellent competitiveness is attained in different aspects (heating speed, price, improvement of fuel efficiency, and cost for device configuration).

Figure 5:
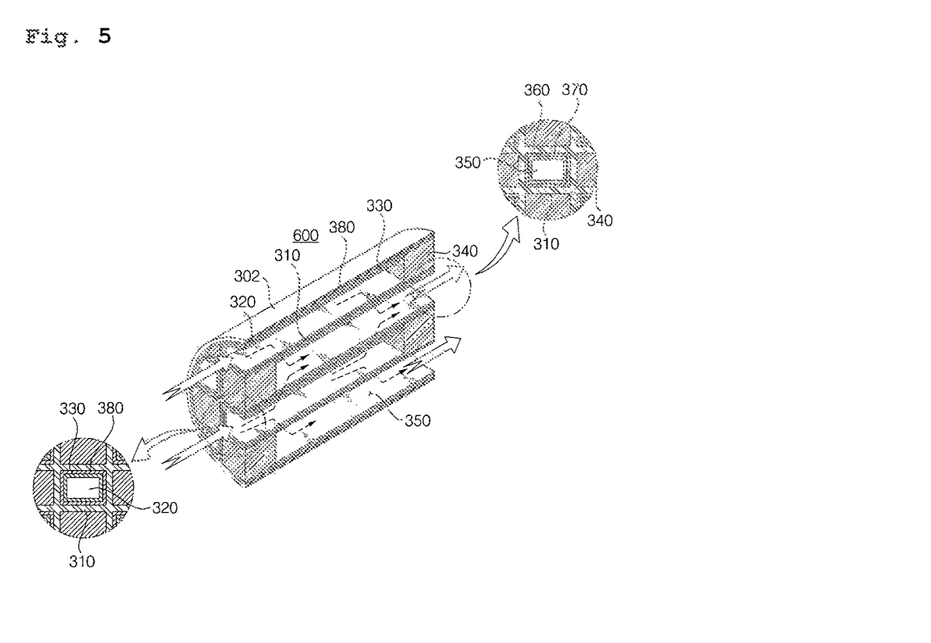
FIG. 5 is a schematic view illustrating appearance of the multifunctional exhaust gas purifying filter (MFPF) illustrated in FIG. 4, which is coated with the oxidation catalyst.

In order to achieve the second and third objects of the present invention, an adsorption layer such as zeolite with excellent hydrocarbon adsorption ability is primarily coated on the surface of a contaminated gas inlet hole and/or outlet hole, and an oxidation catalyst is secondarily coated on the adsorptive layer, as illustrated in FIG. 5. Since a whole of the filter can be uniformly catalyst-coated by filling macropores of the filter surface and square corner portions of a gas flow channel with zeolite, a hydrocarbon adsorption function at a low temperature may be obtained while minimizing the waste factor of the catalyst.

By the process described above, it is possible to provide a MFPF enabling a SCR catalytic layer to have hydrocarbon adsorption ability at a low temperature, CO, HC and PM oxidation ability at a high temperature, and a high $NO_2/NOx$ ratio.

Advantageous Effects

The multifunctional exhaust gas purifying filter disclosed in the present invention may provide various advantages, such as minimization in inflow of HC to the SCR catalytic layer at a low temperature to maximize the SCR function, minimization in consumption of the oxidation catalyst, improvement of economic efficiency by removing the cost of honeycombs for DOC and canning, improvement of the fuel efficiency by a decrease in discharge resistance of exhaust gas due to removal of DOC, and increase in the decomposition efficiency of nitrogen oxides by fast heating, and easy installation thanks to compact configuration.

Due to the foregoing characteristics, it is possible to provide a diesel exhaust gas purifying apparatus applicable to vehicles in use as well as vehicles delivered from warehouse.

BEST MODE

Hereinafter, preferable embodiments of the present invention will be described with reference to the accompanying drawings. Referring to the drawings, wherein like reference characters designate like or corresponding parts throughout the several views. In the embodiments of the present invention, detailed description of the publicly known functions and configurations that are judged to be able to make the purport of the present invention unnecessarily obscure are omitted.

First, with reference to FIG. 4, a multifunctional exhaust gas purifying filter 500 according to a first embodiment of the present invention, which can realize the first object described above, will be described.

The multifunctional exhaust gas purifying filter 500 is characterized in that an NO oxidation catalyst 360 is coated on an inner wall surface of a gas outlet passage 350 of the multifunctional exhaust gas purifying filter 500 in order to supply nitrogen oxide with a high $NO_2$ concentration to SCR, regardless of changes in the PM collection quantity in the filter.

An oxidation catalyst with strong PM, HC, and CO oxidation reaction, for example, a catalyst mixed with platinum and palladium or single component catalyst may be coated on an inner wall surface of a gas inlet passage 320 of the multifunctional exhaust gas purifying filter 500. When mixing the above materials, a content ratio of palladium to platinum preferably ranges from 10:1 to 1:10.

Further, a catalyst mixed with palladium and platinum with excellent NO oxidation ability or single component catalyst may be coated on a gas outlet passage 350. In this case, the content ratio of palladium and platinum preferably ranges from 10:1 to 1:10. Various forms of oxidation catalyst may be used besides platinum or palladium.

The main point of the present invention is to propose a configuration method of a filter with a high $NO_2$ content, as well as PM, HC and CO removal ability by coating the oxidation catalyst on not only the gas inlet passage 320 but also on the gas outlet passage 350 of the multifunctional exhaust gas purifying filter 500. That is, the main point of the present invention is not to stabilize the catalyst composition.

The oxidation catalyst may be coated on the filter by carrying the oxidation catalyst components representative by palladium or platinum, on a surface of a supporter, for example, heat-resistant γ-alumina; drying and sintering the carried supporter; making the same into slurry; and then, applying the slurry to the filter. Alternatively, a method for coating simultaneously a supporter and catalyst-activated metal by making both of them into sol is also possible. However, in order to give variation to a coating amount along with variation of composition between an inlet side and an outlet side, it is preferable to coat step by step by fixing activated metal on the supporter and making it into slurry.

It is advantageous in terms of performance and economic viability that the content of activated metal is used in the range of 0.3 to 5 g on the gas inlet passage 320 and in the range of 0.1 to 1 g on the exhaust gas outlet passage 350 of the exhaust gas based on 1 liter of cDPF. Especially, the content of precious metal on the gas outlet passage 350 is necessary to be adjusted so as to become $NO_2/NOx=1$. If a concentration of $NO_2$ is higher than that of NO, there is a disadvantage that the cost of precious metal increases compared to the effect of SCR. Since there is a large difference in the average temperature transmitted to cDPF by engine types or installation positions, it is necessary to properly adjust the quantity of precious metal accordingly.

A cell density (cpsi) of 100 or more, preferably 200 or more, more preferably 300 or more is recommended for the multifunctional exhaust gas purifying filter 500. The lower the cell density is, the lower the contact probability becomes between the catalyst coated on the discharge flow channel side of purified gas and the exhaust gas. Because of that, the conversion rate of CO generated from the oxidation of CO and HC that are not removed and the PM oxidation reaction by $NO_2$ cannot be maintained at a high level. On the other hand, if the cell density is too large, there could be problems that the coating of catalyst is not uniform and pressure loss increases.

Figure 6:
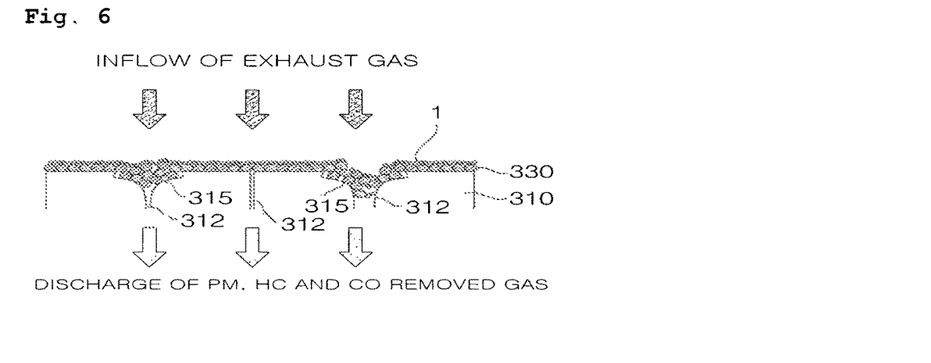
FIG. 6 is a schematic view showing the configuration of a multifunctional exhaust gas purifying filter (MFPF) according to a second embodiment of the present invention.

Next, a multifunctional exhaust gas purifying filter 600 according a second embodiment of the present invention will be described. The second and third objects of the present invention can be realized by the multifunctional exhaust gas purifying filter 600.

Such a multifunctional exhaust gas purifying filter 600 not only provides a hydrocarbon adsorption function at a low temperature, but also forms adsorption layers 370 and 380 simultaneously in the gas outlet passage 350 and/or gas inlet passage 320 before the oxidation catalyst, so as to minimize the waste factor of catalyst.

The adsorption layers 370 and 380 are made of a material with excellent hydrocarbon adsorption ability such as zeolite. The adsorption layers 370 and 380 are primarily coated on the inner wall surface of the gas outlet passage 350 and/or the gas inlet passage 320 and the top of the adsorption layers 370 and 380 are secondarily coated with the oxidation catalysts 330 and 360. Thereby, macropores of the filter surface and corner portions of the gas flow channel are filled with zeolite, so that uniform catalyst coating is possibly performed throughout the whole of the filter, and the waste factor of catalyst can be minimized. Additionally, the hydrocarbon adsorption function at a low temperature is improved by the adsorption layers 370 and 380.

To describe in more detail, the adsorption layers 370 and 380 are primarily coated with a zeolite component, and the oxidation catalyst slurries 330 and 360 are secondarily coated on the adsorption layers 370 and 380. Then, because HC is adsorbed until before it reaches the activation temperature of the outermost catalyst component of the gas outlet passage 350, a decrease in function due to adsorption of HC to SCR can be minimized. By the process described above, it is possible to provide a MFPF enabling a SCR catalytic layer to have a high $NO_2/NOx$ ratio as well as HC adsorption ability at a low temperature, and CO, HC and PM oxidation ability at a high temperature.

Further, according to another catalyst coating method, activated metal as an oxidation catalyst is carried in a heat-resistant ceramic carrier to make it into slurry, a zeolite component is added thereto to prepare a mixed slurry, and then, the prepared slurry can be used for coating.

The process of mixing zeolite in the oxidation catalyst slurry, or coating zeolite and an oxidation component in sequential order, may be executed on both of the exhaust gas inlet side and outlet side, or on one thereof alone. That is, since a HC slip amount may be different depending on vehicle characteristics and control methods, it is necessary to adjust a required amount of HC adsorbent. Therefore, it is necessary to adjust a total coating amount and determine whether the coating is conducted on both sides or on one side alone.

By means of the above-described configuration, it is possible to actively suppress discharge of HC (hydrocarbon or bad smell) generated during vehicle stopping or low-speed driving. Further, a filter temperature increases when the vehicle driving resumes, and most of precious metal-based oxidation catalysts get the SCR function if hydrocarbon exists, when the catalyst reaches the activation temperature. Therefore, a function of reducing some of nitrogen oxides can be exerted. That is, the multifunctional exhaust gas purifying filter (MFPF) 600 may also play a role of decomposing some of nitrogen oxides without supplying the reducing agent required in the rear-end SCR process.

Figure 7:
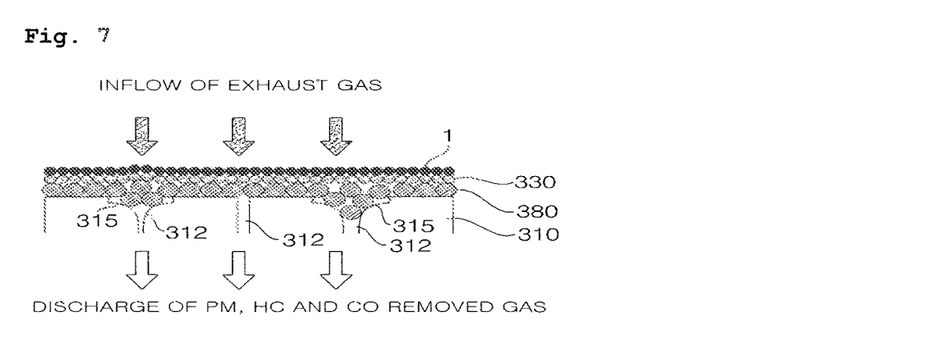
FIG. 7 is a schematic view illustrating appearance of the multifunctional exhaust gas purifying filter (MFPF) illustrated in FIG. 6, wherein the oxidation catalyst is coated on top of an adsorption layer.

As illustrated in FIG. 6, in the related art wherein the oxidation catalyst alone is coated, there is a problem that not only the removal efficiency of PM 1 is lowered but also the oxidation catalyst is wasted as it fills in big holes 312 and 315. However, in the case of a multi-layer structure like the multifunctional exhaust gas purifying filter (MFPF) 600 of the present invention, wherein the zeolite component 370 is primarily coated in the exhaust gas inlet flow channel and then the oxidation catalyst is coated to make a second coating layer, most of big holes 312 and 315 existing on the surface of the filter are filled up during the zeolite coating process as illustrated in FIG. 7, and, at the same time, the holes may be transformed into shapes corresponding to the size of micropores generated by the filling of zeolite powder particles. Accordingly, the waste factor of the second coating catalyst can be minimized and the PM removal efficiency can be increased remarkably. That is, it is possible to alleviate the great deal of effort for adjusting an average pore size distribution and suppressing formation of micropores in a manufacturing process of filter elements. Therefore, a filter manufacturing cost can also be minimized. Further, the waste factor such as filling macropores with the oxidation catalyst can be suppressed as much as possible the catalyst coating process.

Further, there occurs a phenomenon wherein the catalyst gathers in the corners of the flow channel by the surface tension of oxidation catalyst slurry, when the catalyst slurry is coated in the channel of the filter. To suppress this phenomenon, efforts for changing the square channel into a hexagonal channel or circular channel are under way. However, if the corner portions of the filter cell are filled with zeolite having HC adsorptive function by primarily coating the filter cell with the zeolite component having HC adsorption ability according to the present invention, it is possible to simultaneously satisfy two effects: minimizing the waste factor of precious metal catalyst and getting the hydrocarbon adsorption function in the filter itself.

The zeolite coating amount satisfying such functions preferably ranges from 30 to 100 g/L for the gas inlet passage 320, and from 10 to 80 g/L for the gas outlet passage 350. Also, it is possible to determine a total amount of adsorbent and whether to coat both sides or only one side of the exhaust gas inlet and outlet, based on the interval between an engine and the filter, whether post-injection is to be carried out or not, and the frequency of post-injection.

The MFPFs 500 and 600 according to the first and second embodiments of the present invention are configured basically as described above. Next, the configuration of the exhaust gas purifying apparatus using the multifunctional exhaust gas purifying filter 600 will be described.

Figure 8:
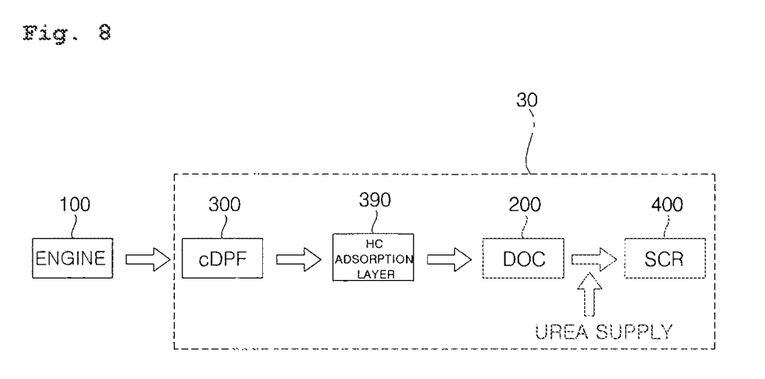
FIG. 8 is a block diagram showing the configuration of an exhaust gas purifying apparatus wherein effects of HC are minimized using a cDPF and a DOC according to the related art.

In order to suppress hydrocarbon flowing into the SCR catalytic layer, such a configuration as sequential arrangement of the cDPF 300, a hydrocarbon adsorption layer 390, the DOC 200 and the SCR 400 at the rear end of an engine 100 in a functionally separate form, as illustrated in FIG. 8, is also possible. However, the foregoing configuration takes a lot of time for heating up to the operational temperature of the SCR 400, so a supply time of the reducing agent for decreasing nitrogen oxides is shortened, eventually resulting in a decrease in the nitrogen oxide removal quantity.

Further, in the above-described configuration, each unit is heated in the order close to the engine 100, in view of the order of the temperature rise of each unit. Therefore, the HC oxidation rate may not be maintained at a high level, because the temperature of DOC 200 at the rear end of the engine is relatively low even if the hydrocarbon adsorption layer 390 is heated first to start separation of hydrocarbon. Consequently, it is inevitable that HC is introduced into the SCR reactor 400.

Figure 9:
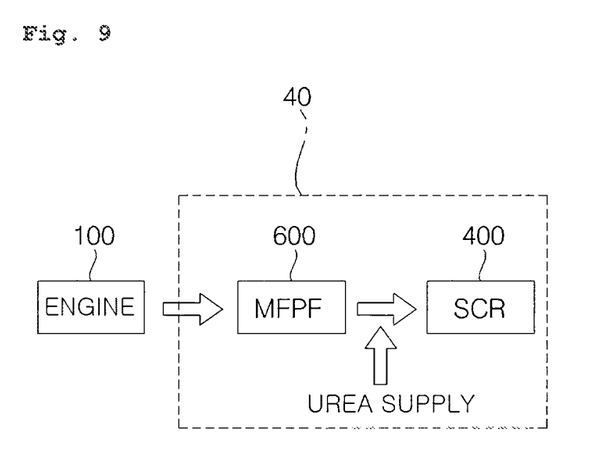
FIG. 9 is a block diagram showing a first configuration example of an exhaust gas purifying apparatus using the MFPF according to the present invention.

However, the exhaust gas purifying apparatus 40 using the multifunctional exhaust gas purifying filter 600 according to the second embodiment of the present invention actively suppresses flowing of hydrocarbon into the SCR reactor and provides an MFPF with a function of supplying high concentration $NO_2$. Accordingly, as illustrated in FIG. 9, it is possible to simplify the configuration of the apparatus. The discharge of adsorbed HC can be minimized because the heating speed is the same when the adsorption layer and oxidation catalyst, respectively, are coated on the surface of a single filter. Accordingly, it is possible to provide additional effects (i.e., competitiveness) of decreasing the cost and installation area by reducing the number of devices, besides in the functional term of the multifunctional performance. The SCR 400 can be made of a zeolite catalyst in which a transition metal is ion-exchanged.

Figure 10:
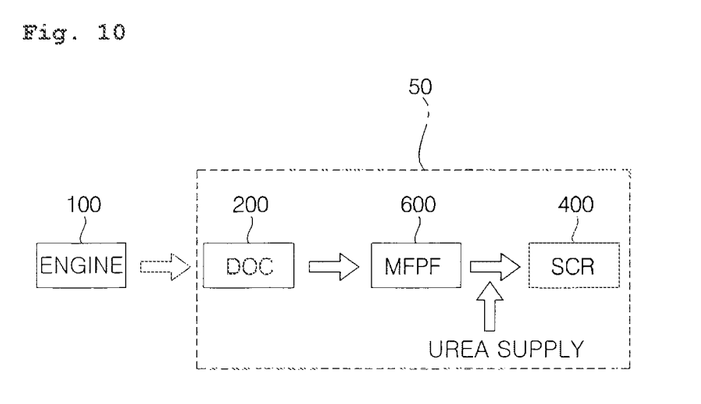
FIG. 10 is a block diagram showing a second configuration example of an exhaust gas purifying apparatus using the MFPF according to the present invention.

Further, when installing the exhaust gas purifying apparatus having such a configuration as described above, in a vehicle in use, it is not possible to position an MFPF in a range of 10 to 30 cm downstream of the turbocharger. Especially, for a vehicle with a high PM generation amount, it is necessary to further install DOC 200 upstream of MFPF 600 in order to generate a lot of $NO_2$ and positively induce oxidation of PM, HC and CO, like the exhaust gas purifying apparatus 50 illustrated in FIG. 10. Also, when using zeolite as in the configuration of the foregoing filter 600, it is obvious that effects of positively decreasing the amount of precious metal used at the same time of adsorption of HC can be attained.

While the present invention has been described with reference to the preferred embodiments, it will be understood by those skilled in the related art that various modifications and variations may be made therein without departing from the scope of the present invention as defined by the appended claims.

DESCRIPTION OF REFERENCE NUMERALS IN DRAWINGS

1: PM
10, 20, 30, 40, 50: exhaust gas purifying apparatus
100: engine, 200: DOC
300: cDPF, 302: housing
310: gas penetrable wall, 320: gas inlet passage
330, 360: oxidation catalyst, 340: plug
350: gas outlet passage, 370, 380: adsorption layer
390: HC adsorption layer, 400: SCR
500, 600: MFPF

The invention claimed is:

1. An exhaust gas purifying apparatus, comprising:
a multifunctional exhaust gas purifying filter installed at a rear end of an engine; and
a selective catalytic reduction (SCR) catalyst disposed downstream of the multifunctional exhaust gas purifying filter,
wherein the multifunctional exhaust gas purifying filter comprises:
   a housing including a plurality of channels which extend in a longitudinal direction of the housing and have cross-sections of grid shape formed by air-penetrable walls; and
   a gas inlet passage and a gas outlet passage defined by plugs fixed to either an upstream end portion or downstream end portion of each of the channels in a gas flow direction around the air-penetrable walls,
wherein the gas inlet passage is surrounded by the gas outlet passage, and
wherein inner surfaces of the gas inlet passage and the gas outlet passage are primarily coated with zeolite, and openings of macropores present in a filter wall are filled with the zeolite to form an adsorption layer in a predetermined thickness, and the adsorption layer secondarily coated with an oxidation catalyst to reduce the openings of macropores.

2. The exhaust gas purifying apparatus of claim 1, wherein the oxidation catalyst includes any one selected from platinum and palladium.

3. The exhaust gas purifying apparatus of claim 1, wherein a diesel oxidation catalyst (DOC) is disposed between the engine and the multifunctional exhaust gas purifying filter.

4. The exhaust gas purifying apparatus of claim 1, wherein an aqueous solution of urea as a reducing agent is injected downstream of the multifunctional exhaust gas purifying filter.

5. The exhaust gas purifying apparatus of claim 1, wherein the SCR catalyst is a zeolite catalyst in which a transition metal is ion-exchanged.

6. The exhaust gas purifying apparatus of claim 3, wherein the DOC is coated with an oxidation catalyst mixed with zeolite.

7. The exhaust gas purifying apparatus of claim 3, wherein the DOC is primarily coated with zeolite and the surface of zeolite is secondarily coated with an oxidation catalyst.

* * * * *